US010293258B2

(12) United States Patent
Smith

(10) Patent No.: US 10,293,258 B2
(45) Date of Patent: May 21, 2019

(54) ENHANCED METHOD AND APPARATUS FOR SELECTING AND RENDERING PERFORMANCE DATA

(71) Applicant: NINTENDO CO., LTD., Kyoto (JP)

(72) Inventor: Darren C. Smith, Sammamish, WA (US)

(73) Assignee: NINTENDO CO., LTD., Kyoto (JP)

( * ) Notice: Subject to any disclaimer, the term of this patent is extended or adjusted under 35 U.S.C. 154(b) by 0 days.

(21) Appl. No.: 15/420,897

(22) Filed: Jan. 31, 2017

(65) Prior Publication Data

US 2017/0136360 A1  May 18, 2017

Related U.S. Application Data

(60) Continuation of application No. 14/747,574, filed on Jun. 23, 2015, now Pat. No. 9,592,445, which is a
(Continued)

(51) Int. Cl.
 *A63F 13/323* (2014.01)
 *A63F 13/355* (2014.01)
(Continued)

(52) U.S. Cl.
 CPC .......... *A63F 13/537* (2014.09); *A63F 13/00* (2013.01); *A63F 13/20* (2014.09); *A63F 13/31* (2014.09);
(Continued)

(58) Field of Classification Search
None
See application file for complete search history.

(56) References Cited

U.S. PATENT DOCUMENTS 3,008,367 A  11/1961  Parsons
4,149,444 A   4/1979  Parsons
(Continued)

FOREIGN PATENT DOCUMENTS

FR  2 932 998  1/2010
GB  2 347 332  8/2000
(Continued)

OTHER PUBLICATIONS

Apple Support: "iPhone—Technical Specification," URL:http://support.apple.com/kb./SP2, XP002662079, Feb. 19, 2010, 2 pages.
(Continued)

*Primary Examiner* — Damon J Pierce
(74) *Attorney, Agent, or Firm* — Nixon & Vanderhye P.C.

(57) ABSTRACT

Enhanced methodology and apparatus for use in a multi-player video game for generating a array of user selectable options for choosing real or computer generated users to play with and/or compete against. For example, in a simulated multiple driver racing game application, the user of a computing device is presented with an option for selecting any of various "ghost data" packages for downloading over a communication network such as the Internet. For example, the user may be presented with the option of selecting one of an array of ghost data packages to race against such as the top five buddies of the user with highest scores, five buddies with scores similar to a user's own score, and teams/groups of various varieties. A simulated race in a computing device initially occurs with objects and a playing field of relatively low graphic complexity, limited by constraints of the system's processing power and the associated limited number of polygons that can be processed per second, the resolution of the screen, etc. A more powerful rendering of such objects/playing field thereafter takes place in a server after the ghost/performance data is collected and uploaded.

21 Claims, 7 Drawing Sheets

Related U.S. Application Data continuation of application No. 13/934,618, filed on Jul. 3, 2013, now Pat. No. 9,067,133, which is a continuation of application No. 12/366,100, filed on Feb. 5, 2009, now Pat. No. 8,500,558, which is a division of application No. 11/207,194, filed on Aug. 19, 2005, now Pat. No. 8,696,464.

(51) Int. Cl.

| | | |
|---|---|---|
| *A63F 13/537* | (2014.01) | |
| *A63F 13/525* | (2014.01) | |
| *A63F 13/52* | (2014.01) | |
| *A63F 13/92* | (2014.01) | |
| *A63F 13/327* | (2014.01) | |
| *A63F 13/5258* | (2014.01) | |
| *G09B 19/22* | (2006.01) | |
| *A63F 13/00* | (2014.01) | |
| *A63F 13/46* | (2014.01) | |
| *A63F 13/5252* | (2014.01) | |
| *A63F 13/795* | (2014.01) | |
| *A63F 13/803* | (2014.01) | |
| *A63F 13/95* | (2014.01) | |
| *G06F 3/0481* | (2013.01) | |
| *A63F 13/20* | (2014.01) | |
| *A63F 13/31* | (2014.01) | |
| *A63F 13/63* | (2014.01) | |
| *A63F 13/86* | (2014.01) | |

(52) U.S. Cl.
CPC .......... *A63F 13/323* (2014.09); *A63F 13/327* (2014.09); *A63F 13/355* (2014.09); *A63F 13/46* (2014.09); *A63F 13/52* (2014.09); *A63F 13/525* (2014.09); *A63F 13/5252* (2014.09); *A63F 13/5258* (2014.09); *A63F 13/63* (2014.09); *A63F 13/795* (2014.09); *A63F 13/803* (2014.09); *A63F 13/86* (2014.09); *A63F 13/92* (2014.09); *A63F 13/95* (2014.09); *G06F 3/04815* (2013.01); *G09B 19/22* (2013.01); *A63F 2300/513* (2013.01); *A63F 2300/554* (2013.01); *A63F 2300/556* (2013.01); *A63F 2300/634* (2013.01); *A63F 2300/8017* (2013.01)

(56) References Cited

U.S. PATENT DOCUMENTS

| | | | |
|---|---|---|---|
| 4,679,479 A | 7/1987 | Koyamato | |
| 4,821,121 A | 4/1989 | Beaulier | |
| 4,913,023 A | 4/1990 | Mizuguchi et al. | |
| 5,618,179 A | 4/1997 | Copperman et al. | |
| 6,115,036 A | 9/2000 | Yamato et al. | |
| 6,366,283 B1 | 4/2002 | Tampieri | |
| 6,488,505 B1 | 12/2002 | Hightower | |
| 6,645,067 B1 | 11/2003 | Okita et al. | |
| 6,658,464 B2 | 12/2003 | Reisman | |
| 6,692,359 B1 | 2/2004 | Williams et al. | |
| 6,699,125 B2 | 3/2004 | Kirmse et al. | |
| 6,699,127 B1* | 3/2004 | Lobb | A63F 13/10 345/418 |
| 6,755,654 B2 | 6/2004 | Hightower | |
| 6,821,205 B2 | 11/2004 | Takahashi et al. | |
| 6,835,137 B1* | 12/2004 | Nakamura | A63F 13/10 463/42 |
| 6,848,997 B1 | 2/2005 | Hashimoto et al. | |
| 6,884,171 B2 | 4/2005 | Eck et al. | |
| 7,032,007 B2 | 4/2006 | Fellenstein et al. | |
| 8,500,558 B2 | 8/2013 | Smith | |
| 8,696,464 B2 | 4/2014 | Smith | |
| 2002/0045484 A1 | 4/2002 | Eck et al. | |
| 2004/0023719 A1 | 2/2004 | Hussaini et al. | |
| 2004/0111479 A1 | 6/2004 | Borden et al. | |
| 2004/0152517 A1 | 8/2004 | Hardisty et al. | |
| 2004/0153557 A1 | 8/2004 | Shochet et al. | |
| 2004/0162144 A1 | 8/2004 | Loose et al. | |
| 2004/0164897 A1 | 8/2004 | Treadwell et al. | |
| 2004/0192440 A1 | 9/2004 | Evans et al. | |
| 2004/0219980 A1 | 11/2004 | Bassett et al. | |
| 2004/0224741 A1 | 11/2004 | Jen et al. | |
| 2004/0224772 A1 | 11/2004 | Canessa et al. | |
| 2004/0225386 A1 | 11/2004 | Thompson et al. | |
| 2005/0160144 A1 | 7/2005 | Bhatia | |
| 2005/0239550 A1 | 10/2005 | Hardisty et al. | |
| 2005/0044575 A1 | 12/2005 | Kuyl | |
| 2006/0058103 A1* | 3/2006 | Danieli | A63F 13/12 463/42 |
| 2006/0068917 A1 | 3/2006 | Snoddy et al. | |
| 2006/0146049 A1 | 7/2006 | Pulli et al. | |
| 2006/0252537 A1 | 11/2006 | Wu | |
| 2008/0015017 A1 | 1/2008 | Ashida et al. | |
| 2010/0007926 A1 | 1/2010 | Imaizumi et al. | |
| 2013/0296052 A1 | 11/2013 | Smith | |

FOREIGN PATENT DOCUMENTS

| | | |
|---|---|---|
| JP | 9-294260 | 11/1997 |
| JP | 2000-237451 | 9/2000 |
| JP | 2002-301266 | 10/2002 |
| JP | 2003-047778 | 2/2003 |
| JP | 2003-093745 | 4/2003 |
| JP | 2003-320164 | 11/2003 |
| JP | 2004-032548 | 1/2004 |
| JP | 2004-141525 | 5/2004 |
| JP | 2004-313402 | 11/2004 |
| JP | 2004-329949 | 11/2004 |
| JP | 2009-178363 | 8/2009 |
| JP | 2009-247763 | 10/2009 |
| JP | 2010-017412 | 1/2010 |
| WO | WO 02/061707 | 8/2002 |
| WO | WO 2007/143632 | 12/2007 |

OTHER PUBLICATIONS

CheckIM.com, "Proactive Protection for the Masses, About," 2 pages (2004).
CheckIM.com, "Proactive Protection for the Masses, Trace Online Predators," 2 pages (2005).
English-language machine translation for JP 09-294260.
English-language machine translation for JP 2004-032548.
English-language machine translation for JP 2009-178363.
English-language machine translation for JP 2009-247763.
English-language machine translation of JP 2010-017412.
Extended European Search Report issued in EP Appln. 11176475.9 dated Nov. 24, 2011.
Extended European Search Report issued in EP Appln. 11176477.5 dated Nov. 24, 2011.
Extended European Search Report issued in EP Appln. 11176478.3 dated Nov. 24, 2011.
Extended European Search Report issued in EP Appln. 11176479.1 dated Nov. 24, 2011.
http://www.cnn.com/TECH/computing/9802/12/online_gaming_part2/, Feb. 12, 1998, 5 pages.
http://www.findarticies.com/p/articles/mi_m0EIN/is_1996_May_16/ai_18290451, May 16, 1996, 2 pages.
http://www.internetnews.com/xSP/article.php/45591, Dec. 18, 1998, 4 pages.
International Preliminary Report on Patentability and Written Opinion of the International Search Authority for PCT/US2006/032538, 11 pages.
Japanese Office Action for related Japanese Application No. 2008-527201, four pages, dated Jun. 26, 2012.
Mario Kart 64 Instruction Booklet, Nintendo, 1997.
Mario Kart 64 Operation card, Nintendo 64, 1997.
Office Action issued in U.S. Appl. No. 11/464,895 dated Dec. 17, 2008.

(56) References Cited

OTHER PUBLICATIONS

Playstation 2, Gran Turismo 3 A-spec Game Manual, Apr. 28, 2001.
www.safelibraries.org, "Dangers Children Face in Cyberspace," 2 pages (Mar. 2006).
EP Search Report dated Oct. 27, 2017 in Application No. 17191540 (8 pages).
International Search Report for PCT/JP/2011/000565, dated Mar. 8, 2011 (2 pages).
International Search Report for PCT/JP/2011/000566, dated Mar. 8, 2011 (2 pages).
JP Office Action in Application No. 2012-217482 dated Jun. 18, 2014 with machine translation (8 pages).

\* cited by examiner

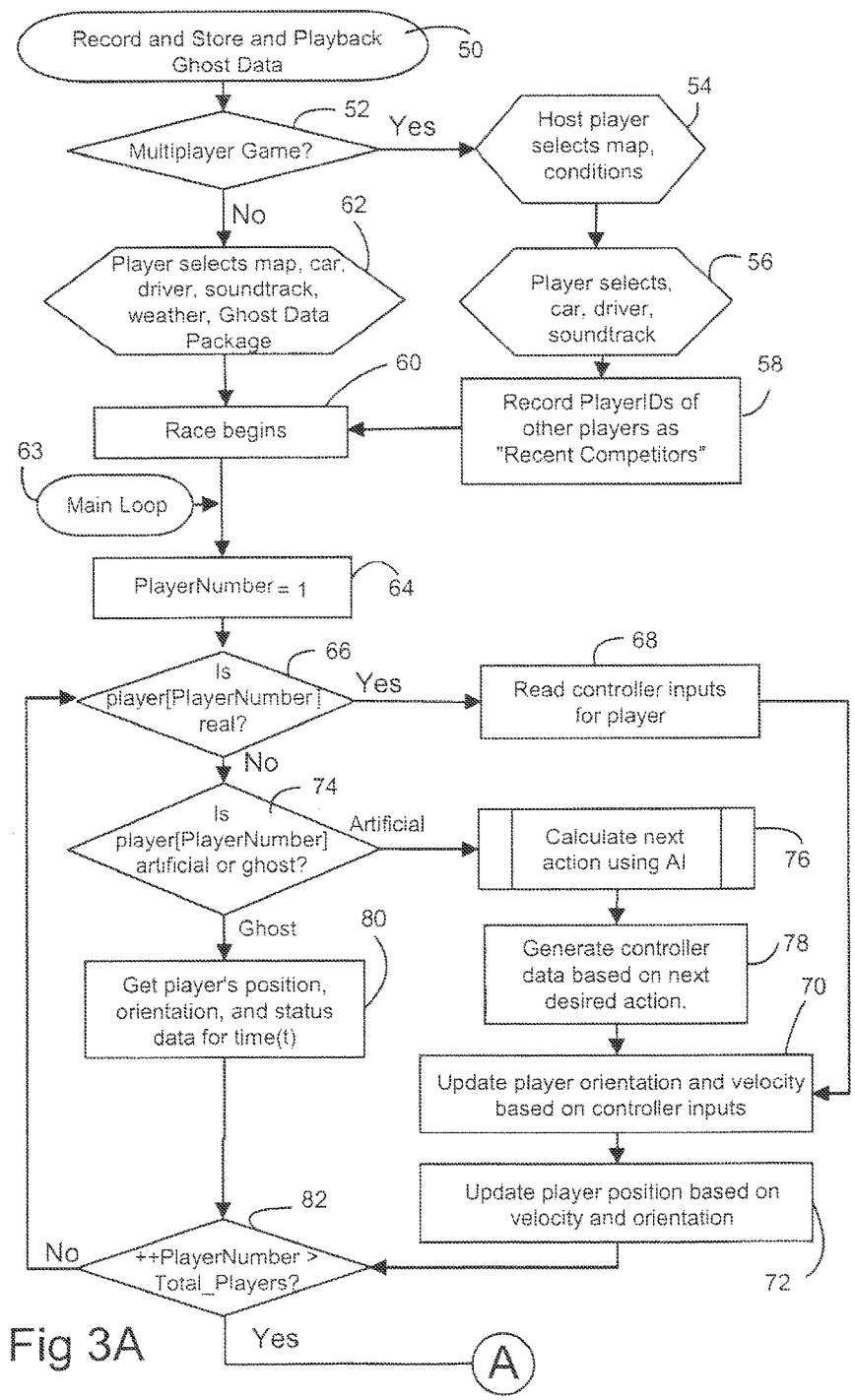

ENHANCED METHOD AND APPARATUS FOR SELECTING AND RENDERING PERFORMANCE DATA

CROSS-REFERENCES TO RELATED APPLICATIONS

This application is a continuation of U.S. application Ser. No. 14/747,574, filed Jun. 23, 2015, which is a continuation of U.S. application Ser. No. 13/934,618, filed Jul. 3, 2013, (now U.S. Pat. No. 9,067,133); which is a continuation of U.S. application Ser. No. 12/366,100, filed Feb. 5, 2009 (now U.S. Pat. No. 8,500,558); which is a divisional of U.S. application Ser. No. 11/207,194, filed Aug. 19, 2005 (now U.S. Pat. No. 8,696,464), the entire contents of each being hereby incorporated by reference in this application.

FIELD OF THE INVENTION

This invention generally relates to multi-user performance data simulators. More particularly, the invention relates to enhanced methodology and apparatus for selecting and rendering performance data in multi-player video games such as "ghost" performance data in racing games.

BACKGROUND AND SUMMARY OF THE INVENTION

Racing type video games have been popular for many years. It has been well known in such video games to permit a player to capture racing data indicative of the player's racing performance and race against captured "ghost" data in subsequent races.

For example, in Mario Kart 64, the game program captures ghost data as a player's vehicle races around the track recording vehicle location information at each point in the performance. Once the race is complete, the player can choose to race on the track again and compete against a "ghost" car whose position is dictated by the player's previous performance based on stored "ghost data."

Certain prior art video games have permitted one player to give ghost data to another player, so that the two players can race "against" each other, even though they aren't racing in real time. For example, the first player may copy ghost data to a memory card and give this memory card to a second player. The second player may use such a memory card in his or her own game system and race against the first player's ghost data at any time.

It has also been known for ghost data to be uploaded and downloaded from a database via the Internet. See, for example, the Microsoft X-Box game "Project Gotham Racing II."

The present illustrative exemplary embodiments provide enhanced methodology and apparatus for use in a multi-player video game for generating a array of user selectable options for choosing real or computer generated users to play with and/or compete against.

In one illustrative embodiment, in a simulated multiple driver racing game application, the user of a computing device is presented with an option for selecting any of various "ghost data" packages for downloading over a communication network such as the Internet. For example, the user may be presented with the option of selecting one of an array of ghost data packages to race against such as the top five players with highest scores, the top five buddies of the user with highest scores, five buddies with scores similar to a user's own score, the top five performances as rated by others, teams/groups of various varieties, the best performances of the top five recent competitors, and the top five ghost data that best matches the player's best ghost data.

With respect to providing races against selectable teams or groups, in an exemplary embodiment, rather than downloading the ghost data of one player, or combining individual performances of multiple players according to a performance-based criteria, a team or group package combines individual ghost data collected from the performances of multiple players who were playing the same instance of a game, interacting with each other in real-time on the same race course at exactly the same time. By selecting such a package involving a number of users playing the same game at the same time, the stored ghost data relating to such game play will involve interaction of ghost vehicles (which typically would not occur if ghost data were retrieved based on different races on the same course). Thus, since the ghost data reflects collisions that occurred in a real race, a subsequent display of such ghost data will depict collisions among ghost vehicles.

In accordance with an exemplary embodiment, the video game system enables a user to download as one data set or unit, multiple ghost data packages from which to choose.

In accordance with at least one exemplary embodiment, the user may select a ghost package of various combinations of players that a user has registered as his or her buddies. The registration occurs in a fashion which permits multiple players to be conveniently authenticated as buddies of each other and permits a wide range of competitive races to be conveniently selectable.

The user may view a selected performance on the user's computing/video game system while controlling the camera viewpoint in the race, or the camera may automatically follow one of the players. The user may alternatively choose to race against the competitors selected via a chosen ghost package.

It should be understood that the methodology for selecting other players/buddies/teams/groups with whom to play and/or to compete against extends beyond racing game applications—even though the illustrative embodiments focus on racing game implementations. It is contemplated that the methodology described herein may be applied to a wide array of simulated activities including, but not limited to a wide array of video games, where the performance of multiple users/buddies are recorded and stored and used subsequently in a simulated multiple user activity. For example, the methodology described herein may be used to select a myriad of combinations of friends/relatives/celebrities against whom to compete in activities ranging from vehicle racing, flight simulation, track and field activities, poker, adventure games, and other games/simulated educational competitions, where multiple player competitions have heretofore been successfully employed.

In accordance with at least one illustrative embodiment, a simulated race in a video game console-based system or hand-held gaming machine initially occurs with objects and a playing field of relatively low graphics complexity, limited by constraints of the game system's processing power and the associated limited number of polygons that can be processed per second, the resolution of the screen, etc. A more powerful rendering of such objects/playing field thereafter takes place by, for example, a more powerful, server computer, after the ghost/performance data has been collected and uploaded.

Such a more powerful rendering can be compiled into, for example, an Audio Video Interleave (AVI) video file format that players can either view on a website or download to a console for viewing (if the console is capable of playing back AVI files). In accordance with such an exemplary embodiment, cars and backgrounds which are rendered using graphic models with very high polygon counts are used to replace their original recorded simulated race counterparts.

A user may then view ghost data performance in very high resolution. If desired, the background and cars may be, in accordance with one exemplary embodiment, completely replaced with a different background and cars in a different setting, although the player's performance (based upon the original ghost data) would, for example, remain substantially the same.

For example, as will be described herein, if a Nintendo DS is utilized as a hand-held gaming machine for playing a racing game, graphic objects of a certain complexity may be handled, e.g., one hundred to five hundred polygons per car. Once player performance data has been uploaded via the Internet to a server, the server may process the ghost data and re-render the race with completely different objects. In such an illustrative embodiment, the racing track/terrain remains substantially as was utilized in the Nintendo DS. Although the original track may remain intact, the background rendering may be radically different. For example, a server rendering may change the original racing locale from a desert location to a tropical resort location. In accordance with such an embodiment, an original two hundred polygon model of a simple go-cart may be completely replaced, for example, with a five thousand polygon simulated Ferrari.

The server's rendering of such data need not be done in real time which eliminates one of the constraints from completing an extremely high quality rendering. The same movements of the vehicle through space would be maintained as occurred in the original race on which the ghost data is based.

A server may, for example, render the race data in a movie MPEG file and download the movie file back to the originating Nintendo DS. Alternatively, the rendering could be placed on a website for accessing by other authorized users. For example, members of a racing team or a group of friends may wish to see their race rendered in such an extremely high quality form.

This illustrative embodiment may be combined with the various embodiments described above and herein so that multiple ghost data packages are rendered into one AVI file. This embodiment likewise has a wide range of applications extending well beyond racing applications.

These and other features, aspects and advantages of the present invention will become more apparent from the following detailed description of the present invention when taken in conjunction with the accompanying drawings.

BRIEF DESCRIPTION OF THE DRAWINGS

FIGS. 3A and 3B are an illustrative flowchart delineating the sequence of operations performed during record, store and playback ghost data processing;

DETAILED DESCRIPTION OF ILLUSTRATIVE EMBODIMENTS

Figure 1:
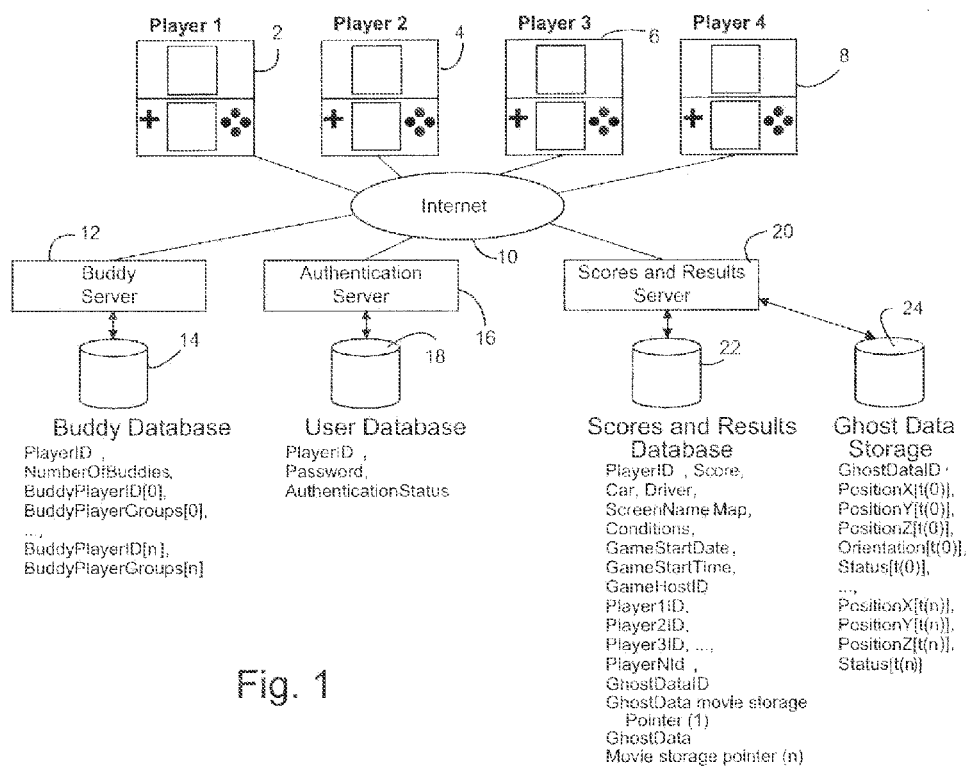
FIG. 1 is a block diagram of an illustrative system for implementing enhanced performance data rendering.

FIG. 1 depicts an illustrative, non-limiting example of a system for practicing an embodiment of the method and apparatus of the claimed invention. As shown in FIG. 1 four hand-held gaming machines 2, 4, 6 and 8, are utilized for accessing the Internet 10.

In the illustrative embodiment, the hand-held game playing machines are Nintendo DS hand-held devices that are operable to wirelessly communicate with each other and wirelessly access the Internet 10. Further details of the Nintendo DS may be found in application Ser. No. 11/111, 985, filed on Apr. 22, 2005, which application is hereby expressly incorporated herein by reference.

It should be understood that a wide variety of computing devices may be utilized rather than a Nintendo DS. For example, game devices 2, 4, 6, 8, may be a wide variety of video game consoles, hand-held devices, or PCs. It is preferable but not mandatory that any such device have, for example, a unique media access control (MAC) address that is used to uniquely identify an Ethernet chip embodied in such a device. Thus, for example, it should be understood that any computing device having networking capability may be utilized in addition to, or in place of, one or more of the Nintendo DS units shown at 2, 4, 6 and 8 of FIG. 1. Devices such as the DS which communicate wirelessly are particularly advantageous due to their enhanced mobility that readily enables a local exchange of buddy information.

Each of the Nintendo DS units 2, 4, 6, 8 are capable of playing a single player or multiplayer game video game. When, for example, users are playing a single player game, the Nintendo DS is not as yet connected to the Internet. Each Nintendo DS 2, 4, 6, 8 may, however, be recording player ghost data during the course of playing a single player racing game. Ghost data may also be recorded in a multiplayer game.

After each user completes a race, the player will have an opportunity to upload recorded ghost data via Internet 10 and using, in the illustrative embodiment, Buddy Server 12, Authentication Server 16 and Scores and Results Server 20 in a manner described below. These servers may, for example, be provided and managed by a video game hardware/software manufacturer.

In accordance with an exemplary embodiment, a player uploading ghost data via the Internet initially is coupled to Authentication Server 16. Authenticator Server 16, after authenticating the user, grants permission to the player's Nintendo DS to access Buddy Server 12 and Scores and Results Server 20.

The processing power needed for server computers 12, 16 and 20 will vary depending upon application demands. For example, for certain applications, the authentication server 16 may be any of a wide range of computers including a personal computer (PC). In accordance with one illustrative embodiment, the Buddy Server 12, the Authentication Server 16 and Scores and Results server 20 contain a dual-core 2 GHz CPU, such as AMD's Opteron, with 8 GB of RAM, and 200 GB hard disk. They may, for example, use a Linux OS, such as Red Hat Enterprise Linux 4, and the databases may be managed by SQL database management software such as Oracle Database 10 Enterprise Edition.

In an exemplary embodiment, each Nintendo DS has an associated unique identifier. For example, each Nintendo DS may be, in an exemplary embodiment, identified by the media access control (MAC) address that is used to uniquely identifying an Ethernet chip embodied in each DS 2, 4, 6, 8. The Nintendo DS identifier used herein may be a combination of an identifier associated with the player and the device itself.

A player ID may be, in accordance with an illustrative embodiment, generated by appending, a random number to the MAC address for distinguishing, for example, different children in a family who use a single Nintendo DS.

The first time a player connects to Authentication Server 16 a command is sent to the server 16 to create a player ID. The player ID may be created in a Nintendo DS and analyzed by Authentication Server 16 together with a Nintendo DS generated user password. Thereafter, when, for example, a user of Nintendo DS 2 accesses Internet 10, Authentication Server 16 prompts the Nintendo DS to log on, resulting in server 16 running a player ID and password check.

Once server 16 authenticates the Nintendo DS 2, a token is generated. In accordance with an illustrative embodiment, the token is a string of bits that is encrypted with a key shared by the Nintendo DS 2 and Authentication Server 16, that is digitally signed by authentication server 16. The token may have an associated expiration date that defines the period of time with which the token may be used.

When a user of, for example, Nintendo DS 2 wants to access Buddy Server 12 and Scores and Results Server 20, as part of an authentication sequence, the DS 2 passes the token to these other servers. The token is advantageously used by Buddy Server 12 and Scores and Results Server 20 to permit these servers 12 and 20 to authenticate a player without having to repetitively access the user database 18. Each of the Buddy server 12 and Scores and Results Server 20 can determine that authentication server 16 generated the token by analyzing the associated digital signature.

Associated with Authentication Server 16 is a user database 18 that stores an array of player IDs, passwords and the authentication status of each player. The authentication status of each player may be utilized, for example, to store status information indicating a player is banned from accessing the system.

Buddy server 12 is utilized to permit a player to register other players as "buddies." In this fashion, a player may use Buddy Server 12 to find on-line, one or more friends with whom to play. For example, Buddy Server 12 may be used to find ghost data of friends against which to race.

In accordance with an exemplary embodiment, player 1 using Nintendo DS 2 and player 2 using Nintendo DS 4 may exchange player IDs with each other. Such IDs may be, for example, during the exchange process entered manually by the players. Thereafter, player 1 may register player 2 as one of his or her buddies with buddy server 12.

Alternatively; where two players are playing in a wireless, off-line local area network mode, player IDs may be automatically exchanged. Thereafter, the next time either player 1 or player 2 accesses the Internet, Buddy Server 12 may be utilized to register the other player's ID as one of his or her buddies.

Buddy server 12 has an associated Buddy Database 14. This database 14 stores, for example, for each stored player ID, the number of buddies associated with the player. A buddy player ID is stored for buddy players 0 to n. Various buddy groups 0 to n also may be stored. One buddy group may, for example, consist of a group of eight of a player's friends. Another group may be a group of relatives, while another buddy group may be members of a racing team. An individual may be a member of multiple groups, such as, for example, a family member and a member of a racing team.

Scores and results server 20 has associated therewith a scores and results database 22 and a ghost data storage database 24. These databases store individual scores and ghost data keyed in the illustrative embodiments to a player ID. For example, when player 1 completes a racing performance, after connecting to authentication server 16, the token generated by server 16 is coupled to scores and results server 20.

Scores and results server 20 determines if the token is valid and, if so, permits player 1 access to the scores and results database 22 and the ghost data storage 24.

After being authenticated, the Nintendo DS controlled by player 1 then submits ghost data representing player 1's performance to server 20. A record is then created that includes the player ID, the score the player achieved in the race, the car the player selected for the race, and the driver the player selected. Additionally, a screen name identifying, for example, the driver's name may be stored.

In an exemplary embodiment, a map or course the user selected for the race and race conditions are also stored. Such conditions may include a wide range of racing conditions including weather conditions and the number of laps that were required to be run. Additionally, the date the racing game started and the race starting time are stored. In an exemplary embodiment, if player 1 was participating in a multiplayer game, the scores and results database 20 stores a host ID and the IDs of the various players involved in the race from player 1 to player n.

Additionally, a ghost data ID pointer is stored that identifies the location in the ghost data storage database 24 where the associated ghost data is stored. In accordance with further embodiments, movie file-related data is also stored in the databases associated with the Scores and Results Server 20 as will be explained in detail below.

Turning next to the ghost data storage 24, a ghost data ID is stored that identifies the ghost data. The stored ghost data includes x, y, z position data from time $t(0)$ to $t(n)$. The x, y, z position in space may, for example, represent the center of mass of a racing vehicle. This position data may be incremented, for example, every $60^{th}$ of a second. Orientation information is also stored from time $t(0)$ to $t(n)$ to identify the orientation of a vector indicating which direction the car is pointing, e.g., forward, backward, to the side, etc.

Vehicle status information also is stored for each interval of time $t(0)$ to $t(n)$ to indicate, for example, that at a particular point in time, the vehicle is in good condition, damaged condition, severely damaged, etc. Such data may be used by a rendering engine to render the car over time in many different states. Scores and Results Server 20 preferably has substantial processing power so that it may efficiently handle all the many queries expected to be received via the Internet.

Figure 2:
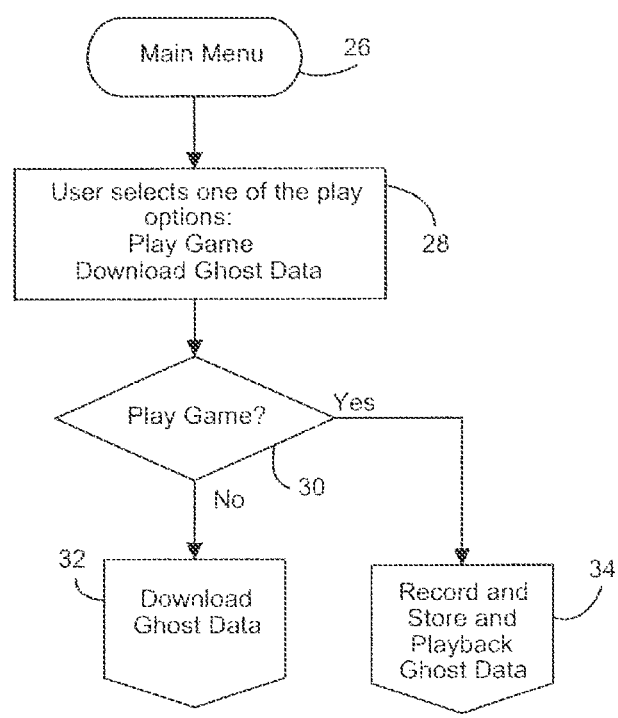
FIG. 2 is a flowchart delineating the general sequence of operations which occur when a player initiates game play in accordance with an exemplary embodiment.

FIG. 2 is an illustrative flowchart delineating the general sequence of operations occurring when a player initiates game play. Initially, a main menu is displayed to a user (26). In accordance with an illustrative, exemplary embodiment, a user after powering up a Nintendo DS has the option of either playing the game or downloading ghost data (28).

A check is then made to determine whether the user has chosen to play the game (30). If the player chooses to play the game, after completion of the player's racing performance, the system branches to record and store and playback ghost data processing (34) as will be described below with respect to FIGS. 3A and 3B.

If the player opts not to play the game, the player then, in accordance with an exemplary embodiment, may download ghost data (32) as will be explained in accordance with the flowchart shown in FIGS. 5A and 5B.

Figure 3B:
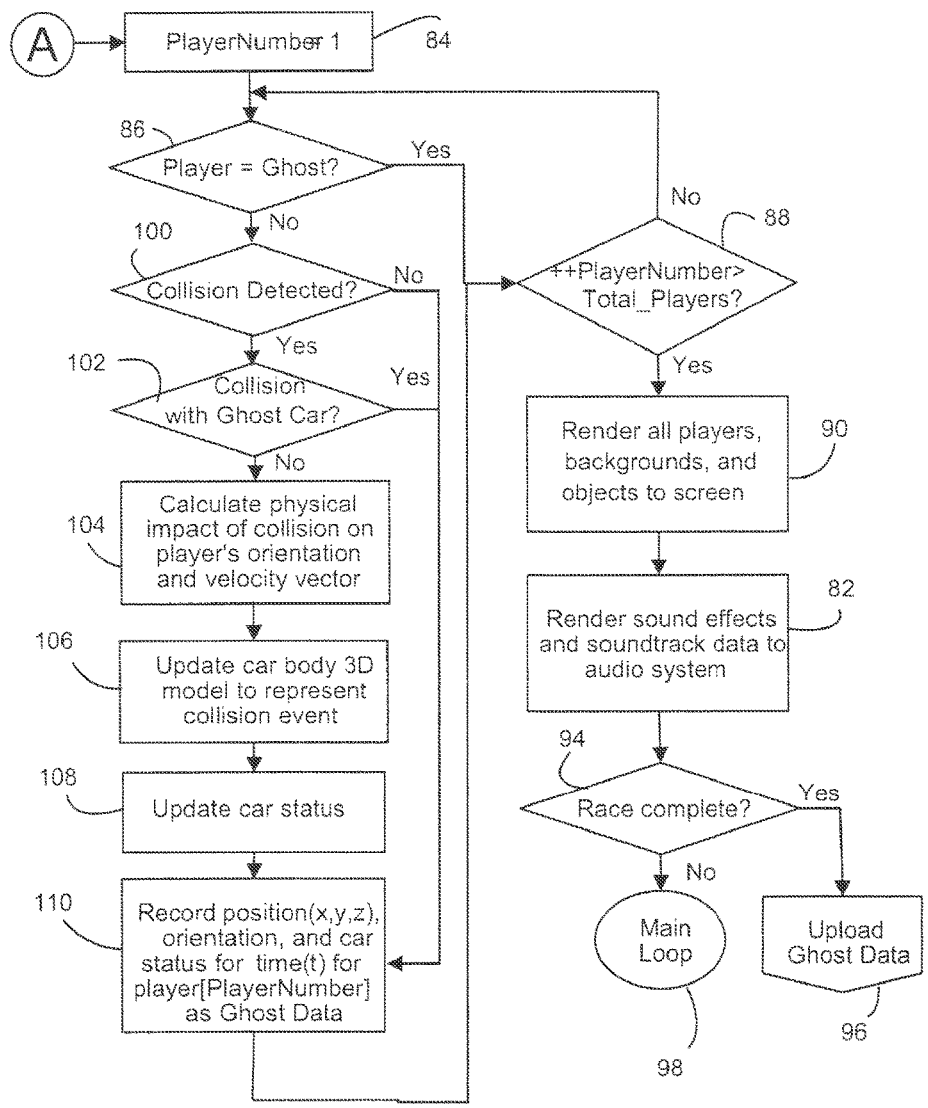

FIGS. 3A and 3B are a flowchart delineating the sequence of operations performed during record, store and playback ghost data processing. Upon entry of record and store and playback of ghost data processing (50), a user is presented with an option of choosing either a single player game or a multiple player game (52).

A single-player game is one in which a player is competing against other players that are generated by programming logic and controlled by artificial intelligence or a decision matrix (and not against other players controlling a game machine in real time). In a single player game, other players also may be represented by previously generated "ghost data". As indicated above, Ghost Data is the recorded performance of a real player, which is played back in another player's world at a later time. Typically, players do not interact or collide with the characters rendered into the world using this ghost data. The player either makes all of the choices about the world state manually, or, if the player pre-selected a Ghost Data package, the conditions under which the ghost data was recorded become the parameters for the player's race—such as map/course, conditions, etc. The player still makes his or her own choice about his own character, limited by the world parameters in the ghost data.

If the player chooses a single player game, a series of menus are presented giving the player an opportunity to select a racing map or course, a car, a driver, a soundtrack, weather and a ghost data package (62). Significantly, the ghost data package as is explained in detail below defines the array of ghost data against which the player may choose compete including, for example, the top five buddies with high scores, five buddies with scores similar to a player's own score, etc.

Once the player has selected all the racing conditions (62), the race parameters are defined, including the ghost competitors with which the player will race. The player may, in accordance with an illustrative embodiment, select a wide array of conditions relating to the race, including a radio station or sound track that may serve as the audio background for the race. The number of laps of the race may likewise be selected.

It should be understood that the ghost data packages, presented to the user in a menu for user selection, may be generated as a function of the conditions which the user has selected. For example, particular sets of ghost data may be selected if a defined weather condition is severe rain.

Turning back to the check at block 52 as to whether a multiplayer game has been selected, if so, the routine sequences to multiplayer processing at 54. There are several types of multiplayer games. Several players play a multiplayer game on one gaming machine. For example, a Nintendo GameCube platform supports four players simultaneously utilizing four controllers coupled to the GameCube. Alternatively, as shown in the illustrative embodiment in FIG. 1, four friends can be simultaneously playing on four different Nintendo DS units 2, 4, 6, and 8. Such play may take place over a local area wireless network or via the Internet using such Nintendo DS units. The present exemplary embodiments contemplate multiplayer game play of either type, as will be appreciated by those skilled in the art. On each Nintendo DS, for example, each player records the player IDs of the other players involved in the multiplayer game. In addition, each player preferably records the player ID of the game host. In this fashion, teams of players may be readily identified. After all pertinent multiplayer data is stored in the respective DS units, game play may begin.

If the game is a multiplayer game (one in which the player is competing with other live players in real-time, each player either playing the game on the same machine with different controllers, or on different machines, but linked through a network), one player is the "host" of the game. The host typically makes the decisions about the map or course that everyone is playing, and other conditions for the game session, such as number of laps in a race, weather conditions, lighting conditions, etc. Individual players make choices about their own character in the world that the host selected, limited by the parameters that the host selected. For example, the individual players may select their car, driver and soundtrack (54).

As indicated above, each player has a unique Player ID, which is at least unique to the machine that the player is using. Each game machine has a unique ID associated with it, such as a MAC address. This number can be used to uniquely identify each player. If the game is a multiplayer game, each player's game stores the Player ID of all other players. Each player's game records the Player IDs of all players in the match as recent competitors (58).

Once all parameters to the race are established, players can begin the race (60) and a main racing loop is entered (63). Initially, a loop counter is set to define the player number (64). The loop counter is initially set to 1 to identify player number 1.

A check is then made to determine whether the player, such as player number 1 is a real player, i.e., a player controlling a Nintendo DS in real time (66).

If the player is a real player, then, for example, the Nintendo DS controller inputs are read for that player (68). In this fashion, a racing game program determines whether the player has depressed a control key indicative of stepping on a gas pedal or controlling steering.

Based on the read controller inputs, the players orientation and velocity information are updated (70). Additionally, the player's position is updated based on the velocity and orientation information (72).

After the player's position has been updated, the player number is incremented and a check is made to determine whether the player number is greater than the total number of players (82). Presuming that four players are involved, after processing has been completed for player 1, player 2 processing begins and the routine branches back to block 66 to determine whether player 2 is a real player If player 2 is not a real player, which will be the case in any single player game, then the routine sequences to block 74, where a check is made to determine whether the player is an artificial computer generated player or a ghost.

If player number 2 is computer generated and is not one of the ghost data package players, the Nintendo DS on which the racing program is executing will calculate the next action based upon computer generated artificial intelligence that may be defined by a decision tree identifying the actions to be taken.

After such computer generated next action is calculated, controller data is generated based on the next desired action (78) and the computer generated player orientation and velocity are updated based on the generated controller inputs (70). Thereafter, the computer generated player's position is updated based on the velocity and orientation information (72). The routine then sequences to block 82, where the player counter is again incremented and a check is made to determine whether the player number is greater than the total number of players.

If the check at block 74 determines that the player is part of the ghost data package, the Nintendo DS accesses from the selected ghost data package for the particular point in time of the race t(0) to t(n), the player's position, orientation and status (80).

Processing through the loop defined by blocks 66 through 82 continues until all players have been processed.

Once all players have been processed, the check at block 82 will trigger a branch to block 84 of FIG. 3B as indicated by the "A" at the bottom of FIG. 3A and the top of FIG. 3B.

Thus, for each player in the race, whether real, computer-generated, or ghost-data generated, the game program updates the player's orientation, velocity, and position in the world based on either controller inputs from a live player, artificially generated controller movements if computer generated player, or the position, orientation, and status information stored in the ghost data.

Turning to FIG. 3B, this portion of the routine cycles through each player to check for collisions. Thus, once each player's position and orientation is determined in three-dimensional space at a time (t), the game program checks each player's condition to determine if the player has collided with a collidable object in the world.

As shown in FIG. 3B, collision processing begins with processing for player number 1 (84). A check is first made to determine whether player number 1 is a ghost (86).

If the player is a ghost, then no collision detection is performed and the routine branches to block 88 where the player number counter is incremented and a check is made to determine whether the player number is greater than the total number of players. If the player number is not greater than the total number of players, the routine branches back to block 86 to check whether the next player is a ghost.

If the check at block 86 determined that player 1 is not a ghost, but rather is a real time or computer generated player, then a check is made as to whether a collision is detected (100). In accordance with an illustrative embodiment, collision detection is determined in a conventional manner by utilizing bounding boxes circumscribing a player's position data. A determination is made as to whether there is an intersection between the player's vehicle position at a given point in time and other objects.

If there is no collision detected, the routine branches to block 110 and ghost data is stored to thereby record the ghost data including vehicle position (x, y, z), orientation and car status at a time (t) for the player, who is identified, for example, by player's number. Such recordation occurs for each time frame from t(0) to t(n).

If the check at block 100 indicates that a collision was detected, and the collision was with a ghost car (102), then the collision, in an exemplary embodiment, is not identified as a collision and processing branches to block 110, where position and orientation data is recorded as previously described. Thus, if a real or computer generated player collides with a car generated from ghost data, in an exemplary embodiment, no collision effect is calculated. For example, such cars may visually appear as completely overlapping on the screen, but no crash will be simulated. In this fashion, no real interaction occurs with ghost cars, so that the position will be recorded as if no collision occurred.

If the collision occurred but was not with a ghost car, then a collision occurred with a valid, collidable object (104). The routine then calculates the physical impact of the collision on the player's orientation and velocity vector. Thus, if there is such a collision, either with a car, or with another item in the world, such as a rock, a barrier, etc., a physics engine calculates the physical impact of the collision on the player's orientation and velocity, by using such information as the weight of the car, the weight of the object collided with, the motion vector of the object collided with (if, for example it was another car or other moving object), the material of the object collided with (elasticity of the material, such as rubber vs. cement).

The program then updates the car's 3D model to represent the collision (106). For example, the 3D model may be altered to show a dent where the collision took place. This could also be done without altering the 3D model, but rather by altering a texture mapped onto the 3D model. Thus, after a collision the updated car body 3D representation may reflect dents/modified textures resulting from a simulated crash.

The car's status is then updated (108). This status data may indicate at various points in time "perfect condition", "damaged", "decreased performance", "severely decreased performance," etc.

Thereafter, the car position, orientation, status for time t for the player is recorded as ghost data (110). Such ghost data takes into account the above-described collision calculations, which result in a modified position, orientation and car status. Such modified data will in turn impact the player position and orientation during the processing which occurs at subsequent points in time as explained above in conjunction with the FIG. 3A processing.

The processing of FIG. 3B cycles through such processing for each race car. Thus, if a player is not a ghost, the player's x, y position, orientation and status is recorded as ghost data for time t.

Once collision processing has occurred for each player as determined by the check at block 88, all players, backgrounds and objects are rendered into the 3D world on the user's computing device display screen (90). All the objects and cars are rendered onto the 3D world, based on what is viewable from the current camera angle perspective. Thus, all polygons which are viewable from the camera's frustum are displayed on the screen.

During the rendering of game play backgrounds and objects to the screen at block 90, the quality of the rendering will vary depending upon the computing device utilized. For example, a Nintendo DS, for example, may perform its real time rendering with objects of relatively low complexity, e.g., using one hundred to five hundred polygons per object.

Figure 4:
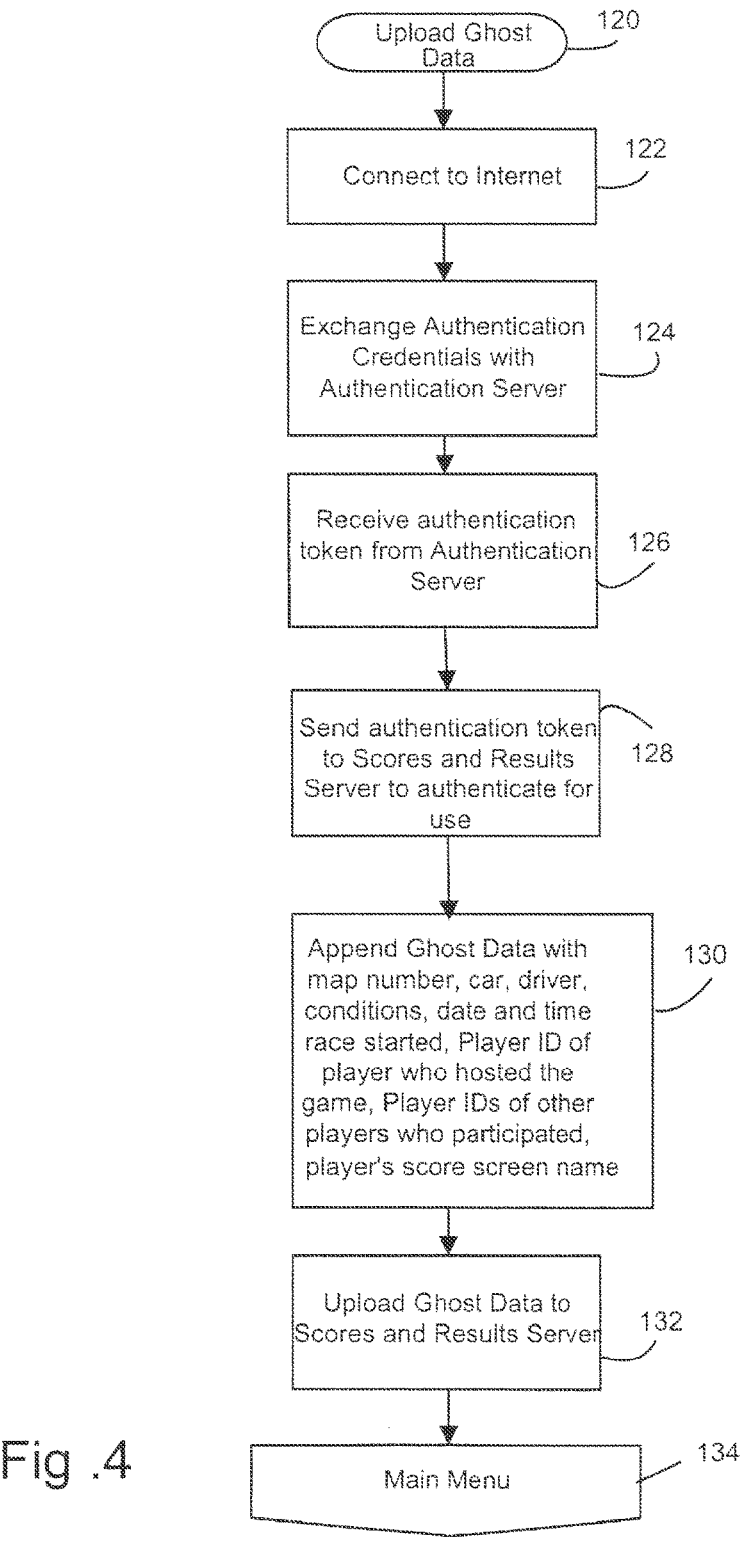
FIG. 4 is an illustrative flowchart delineating the sequence of operation which occurs during the uploading of ghost data.

In accordance with a further exemplary embodiment, an enhanced rendering is performed by a server after ghost or other performance data has been uploaded to the server at block 96 as explained in conjunction with the flowchart shown in FIG. 4. Once having received the uploaded ghost or other performance data, the server may utilize such data into various ghost/performance data packages, as explained above.

In addition, however, such performance data may be rendered into a movie file or an AVI file. The server performing the enhanced rendering steps through received ghost/performance data from time t(0) to t(n) and renders such background and the object data into the 3D world in a fashion similar to the DS rendering. However, instead of using the relatively low complexity background and objects, very high complexity background and objects are utilized. For example, as opposed to representing a vehicle by a go-kart comprised of several hundred polygons, a Ferrari of high complexity comprised of thousands of polygons may be used. Because the rendering on the DS is performed during real time, only a relatively limited period of time is allotted to the rendering process since the rendering of the objects must be completed so that the game can continue.

On the server side, real time constraints are eliminated and great complexity may be introduced into the rendering process as desired. Such a more complex rendering may be downloaded to a DS for viewing. Alternatively, the downloaded files may be forwarded to a player's PC or other computing device as desired.

Once the rendering is performed on the server side, the rendering may be compiled into a movie file of the type the Nintendo DS may download. The server may exercise considerable flexibility in the manner in which the data is rendered. For example, the server may select the first place race finisher as the player behind which the camera angle is to be taken and thereafter render the 3D world from that player's perspective. Alternatively, the camera angle could change as the race progresses to highlight the most exciting interactions in the game, such as spectacular crashes or to follow a car that makes a significant change in position. Commentary could be added to the soundtrack of the movie file, which would be recorded speech of a live person giving their verbal comments while watching the playback of the rendered movie.

In accordance with such an illustrative embodiment, the Scores and Results Server database 22 may include pointers to movie files, e.g., ghost data movie storage pointer 1 through ghost data movie storage pointer N. In accordance with such an embodiment, ghost data storage 24 includes locations for storing ghost data movie information such as AVI files, MPEG files, etc. to capture the more complex renderings of any of a number of different ghost data/player performance data. A separate ghost data storage database may be utilized to store such ghost data movie files. Alternatively, such ghost data movie files may be stored in a portion of the ghost data storage 24.

Additionally, sound effects and sound tracks are rendered to the audio system to generate whatever waveforms are necessary to produce the user chosen sound accompanying the race (92). Further sound effects representing detected collisions are also generated.

A determination is then made at block 94 to determine whether the race is complete. This may be accomplished by, for example, detecting that all cars in the race crossed the finish line the required number of times based upon the number of laps involved in the race (94).

If the race is not complete then the routine branches to the main loop (98) as indicated at 63 in FIG. 3A to begin processing for the next period of time t. If the race is complete, then the ghost data may be uploaded (96).

FIG. 4 is a flowchart delineating an exemplary sequence of operations which occurs during the uploading of ghost data. Whether ghost data is uploaded is determined in an exemplary embodiment based on whether a particular player chooses to upload such data. Each individual player may have different criteria for determining whether his or her performance was worthy of updating.

The updating of ghost data (120) involves, for example, connecting to the Internet (122) via a player's Nintendo DS. As indicated at block 124, the player's computing device 2, 4, 6, or 8 is operatively coupled to Authentication Server 16, and communicates authentication credentials, such as a unique Player ID and password, to this server.

Authentication Server 16 checks the user database 18 for such authentication credential information, analyzes such information and if valid, passes a token back to the game (126). The token is a unique string of data that a gaming device can pass to other servers for convenient authentication. Such servers in turn can verify that the token is valid by a digital signature analysis to verify that the user is an authentic user.

The player's gaming device 2, 4, 6, or 8 sends the token to the Scores and Results Server 20. The Scores and Results Server 20 checks the token for validity. If valid, it grants the gaming device access to the server (128).

In accordance with an illustrative embodiment, processing then proceeds to block 130 where the player's gaming device assembles a wide range of ghost data for uploading. Such ghost data may, for example, include the map number of the game played, the car and driver that the player used in the game, the player's screen name, the conditions of the game (such as weather), the date and time that the race started, and Player ID of the player that hosted the game (if it was a multiplayer game, or the player's own Player ID if it was a single player game), the Player IDs of other players that participated in the game (if a multiplayer game) including the host player ID, and the player's final score in the game (score could be the time it took the player to complete the race, or a measurement of the player's performance in the race, which might be a measurement of the "tricks" performed during the race, or a combination of the two).

After the ghost data is assembled, the player's gaming device then uploads this data to the Scores and Results Server (132). The Scores and Results Server 16 records the conditional data in the Scores and Results Database 22, the performance data itself (the positional/orientation/status data) in Ghost Data Storage 24, and stores a pointer (GhostDataID) to this data with the conditional data in the Scores and Results Database 22.

At the scores and results server 20, a new record is created in the scores and results database 22. In an illustrative embodiment, all the scores and results data appended to the ghost data is stored in the Scores and Results Database 22 and all the position, orientation and status information is stored in the Ghost Storage Database 24. The Scores and Results Server 20 creates for the appended ghost data a pointer associated with the corresponding ghost position, orientation and status data. In this fashion, when a player desires to download ghost data, the query to retrieve such ghost data will result in the accessing of such data from the Scores and Results Server 20 and its databases.

Turning back to FIG. 2, as indicated at block 30, a user has the option of either playing game or downloading ghost data. If the user chooses to download ghost data, then the download ghost data processing (32) is initiated.

Figure 5A:
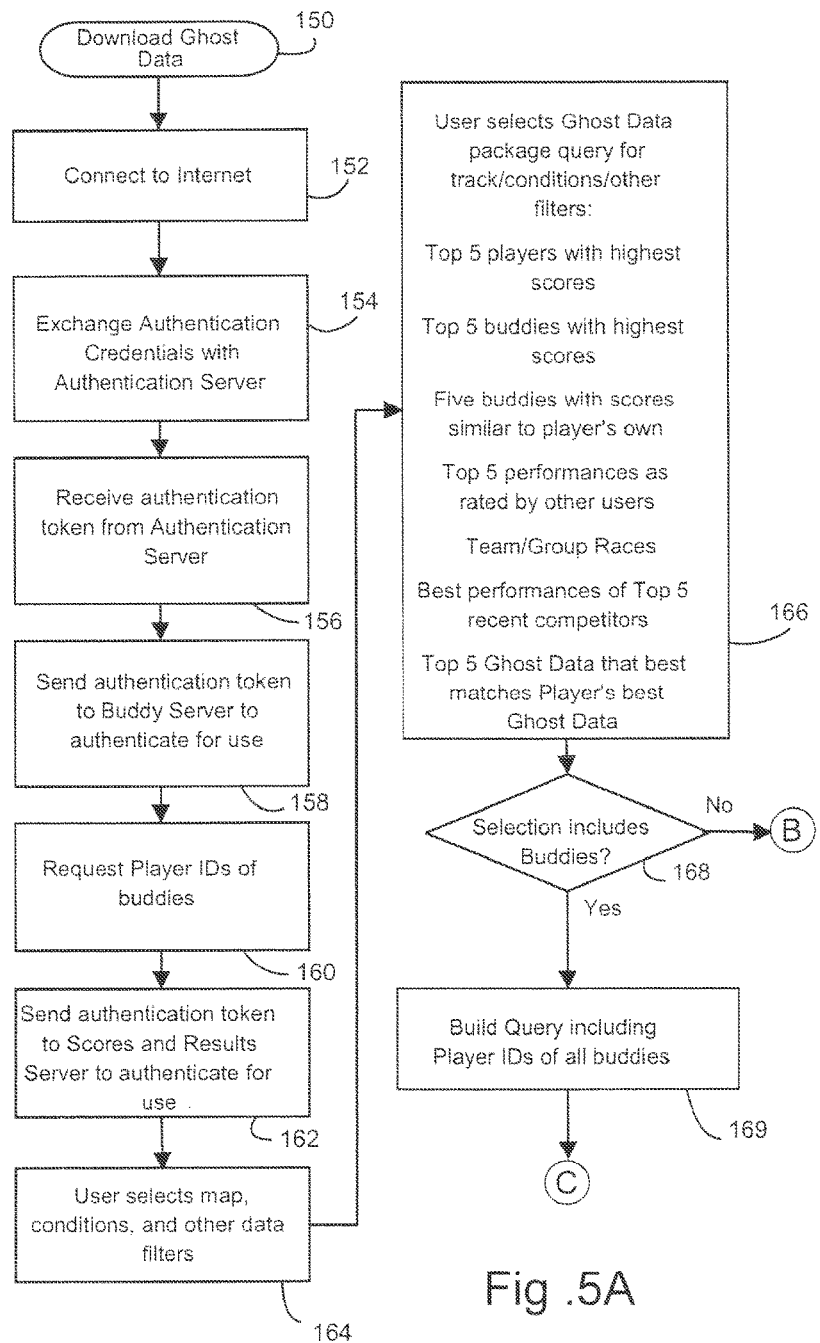
FIGS. 5A and 5B are an illustrative flowchart delineating the sequence of operations involved in downloading ghost data processing.
Figure 5B:
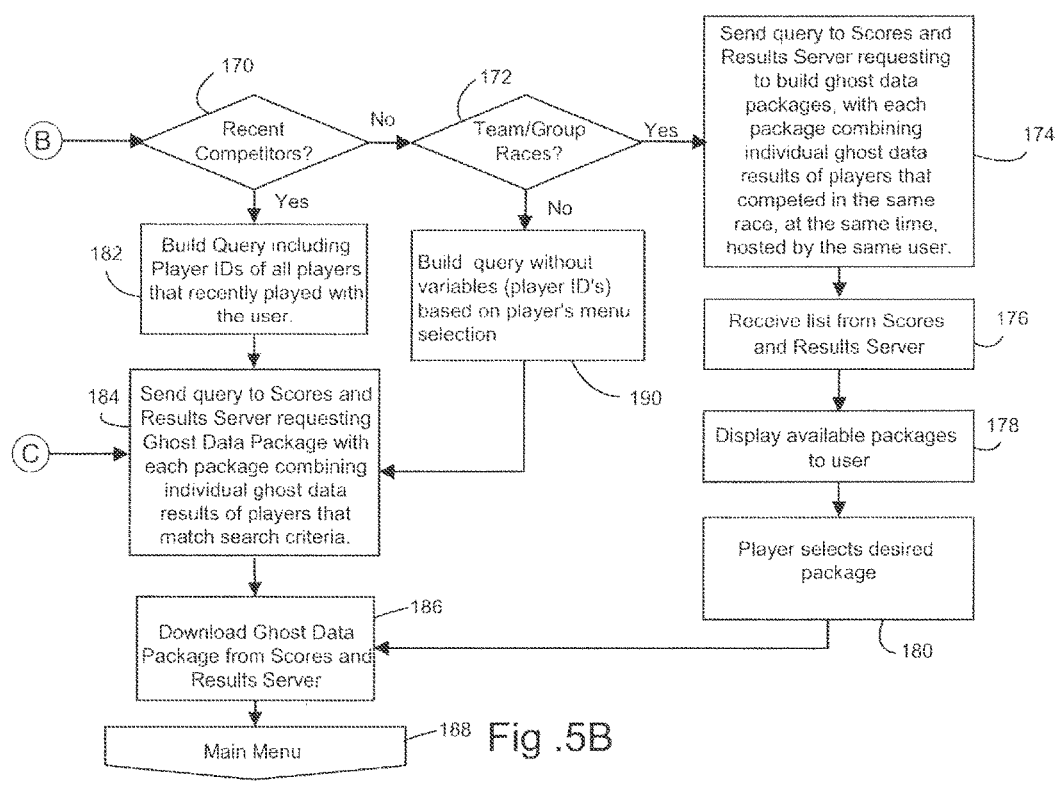

FIGS. 5A and 5B are flowcharts which delineate an exemplary sequence of operations involved in downloading ghost data processing. In downloading ghost data processing, a player first connects to the Internet (152) and exchanges authentication credentials with the Authentication Server 16 (154). As indicated at block 154, the player's computing device 2, 4, 6, or 8 is operatively coupled to Authentication Server 16, and communicates authentication credentials, such as a unique Player ID and password, to this server.

Authentication Server 16 checks the user database 18 for such authentication credential information, analyzes such information and if valid, passes a token back to the game (156). As indicated above, the token is a unique string of data that a gaming device can pass to other servers for convenient authentication. Such servers in turn can verify that the token is valid by a digital signature analysis to verify that the user is an authentic user.

The player's gaming device 2, 4, 6, or 8 sends the token to the Buddy Server 12 to authenticate for use (158). In this fashion, the system permits retrieving ghost information to enable play against a player's buddies stored prior performances.

The player then requests the player ID's of buddies which have been previously stored. At some prior time, a current player will have initiated the input of the players' IDs of one or more buddies such that such buddy player IDs are uploaded to Buddy Server 12 and associated with the player's own player ID in Buddy Database 14 (160).

Thereafter, the player's gaming machine 2, 4, 6, 8 attempts to use the Scores and Results Server 20 by first sending an authentication token to server 20 to authenticate the player/computing device for use of the server's services (162). If valid, Scores and Results Server 20 grants the gaming machine 2, 4, 6, 8 access to the server.

The user then is presented with a number of options from which to select such as maps, e.g., race courses, various conditions and other data filters that are used by the download ghost data logic to select a set of optimum ghost data packages for a player requesting the downloading of ghost data to consider. Thus, a user might select data filters of 1) a tropical paradise course, 2) a course having three laps, and 3) ideal weather conditions (164).

The user is then presented with a further menu which permits the user to select from a wide range of different sets of ghost data packages (166). Ghost Data packages are a combination of multiple, individual Ghost Data performances. The packages may, for example, include:

Top 5 players with the highest scores. For the course/map and other filters selected at block 164, the Scores and Results Server 20 generates a Ghost Data package that contains the Ghost Data for the 5 players that had the highest score on that course.

Top 5 buddies with highest scores. For the course/map and other filters selected at block 164, the Scores and Results Server 20 looks at the Ghost Data for all of the player's buddies, and returns a Ghost Data package that contains the best five performances out of all of the Ghost Data examined.

Five buddies with scores similar to player's own. The Scores and Results Server 20 looks at the Ghost Data for all of the player's buddies, and compares that data to the player's own Ghost Data for that course/map and other filters selected at block 164. The server 20 returns a Ghost Data package that contains performances from the player's buddies that best matched the player's own Ghost Data, e.g., buddies might be selected who all had similarly poor driving performances to the player requesting the downloading the ghost data.

Top 5 performances as rated by other users. In accordance with an exemplary embodiment, players provide feedback about Ghost Data performances, and such data is stored with the Ghost Data (for example, rating the performance on a scale of 1 to 100. The rating would be an average of the responses.) For the course/map and other filters selected at block 164, the Scores and Results Server 20 examines the player feedback for all Ghost Data, and returns a Ghost Data package containing the best five performances as rated by other players.

Team/Group Races. The Scores and Results Server 20 builds a Ghost Data package combining the individual Ghost Data results of players that competed in the same race, at the same time, hosted by the same user (this data is stored with each individual Ghost Data). The returned Ghost Data package, in an exemplary embodiment, returns a menu in which the user is presented with various groups where individual ghost data is accessed by the server and presented to the user including ghost data having the same host player ID, the same race date, and the same time.

Best performances of Top 5 recent competitors. For the course/map and other filters selected at 164, the Scores and Results Server 20 looks at the Ghost Data for all of the players that the player recently played with (the Player IDs of each of these players is stored by the game program, and is passed to the Scores and Results Server 20 as part of the query), and returns a Ghost Data package that contains the best five performances out of all of the Ghost Data examined. In this fashion a player can train to compete against competitors the player will likely have the opportunity to race against in a live race.

Top 5 Ghost Data extending beyond the player's buddies that best matches the player's best Ghost Data. The Scores and Results Server 20 finds five Ghost Data units that match the player's own Ghost Data for that course/map. It returns a Ghost Data package that contains the five performances that best matched.

After the player selects a package, a query to the Scores and Results Server 20 is built based upon the player's selection. If the selection was not "Team/Group races", the query is sent to the Scores and Results Server 20, which returns a single Ghost Data package, that the game program then downloads to its storage. This package can be played back when the player is making selections for the race in single player play mode. If the selection was "Team/Group Races", several packages may return, so the player is presented with the selection of packages after the query. The player selects the desired package and a request for the package is sent to the Scores and Results Server 20 which downloads the package to the player's gaming device.

Turn back to FIG. 5A, a check is made at block 168 to determine whether the selection includes buddies. If so, then the Nintendo DS builds a query, including the player IDs of all buddies (169). In accordance with an exemplary embodiment, the game machine, e.g., the Nintendo DS informs the server 20 as to the identity of the player's buddies.

The routine then sequences to block 184 in FIG. 5B (as indicated by connector C), where a query is sent to Scores and Results Server 20. The query requests a ghost data package with each data package combining individual ghost data results of players that match the search criteria, which in this case will be the player IDs of all buddies. The Scores and Results Server 20 then queries the associated database, finds matches to the search request and combines the ghost data that matches the search criteria of the individual ghost data performances into one unit for transmission. Such a ghost data package is then downloaded from the Scores and Results Server 20 to a memory embodied in, for example, the Nintendo DS (186). The routine then returns to the main menu shown in FIG. 2 (188).

If the check at block 168 indicates at that the selection did not include buddies, then the routine sequences to block 170 of FIG. 5B (as indicated by connector B), where a check is made to determine whether the user selected a recent competitor's ghost package.

If a recent competitor option was selected, then the game machine builds a query including player IDs of all players that recently played with the user (182) and a query is sent to the Scores and Results Server 20 requesting a ghost data package with each data packet combining individual ghost data results of players that match the search criteria as described above (184). The query to the Scores and Results Server 20, in the case of recent competitors may include the best five performances, top five recent competitors and the player IDs of potential candidates.

If the check at block 170 indicates that recent competitors were not selected, then a check is made to determine whether a ghost data package involving teams/group races was selected (172).

If team or group races were not selected, then the DS builds a query without a variable such as player IDs based on a player's menu selection (190) and the routine sends a query to Scores and Results Server 20 as previously indicated (184). Such a query may be formulated based on a standard query such as top five players with highest scores without an identification of any player IDs which condition the request.

If the check at block 172 indicates that the team or group races was selected, then, as indicated at block 174, the game machine, e.g., the Nintendo DS, sends a query to Scores and Results Server 20 requesting the building of ghost data packages with each package combining individual ghost data results of players that competed in the same race at the same time hosted by the same user. Such a query causes Scores and Results Server 20 to retrieve multiple results and send a list of such results to, for example, the requesting Nintendo DS (176). The list sent by the scores and results server is then displayed as packages available to the user (178). The user then scrolls through such a list and selects a desired package (180). Thereafter, the system downloads the selected ghost data from Scores and Results Server 20 to the requesting DS (186) and return to the main menu (188).

Although the present invention has been described in part by illustrative embodiments involving ghost vehicles and driving games, as indicated above, it is contemplated that the methodology described herein may be applied to a wide array of simulated activities. Such activities may include, but are not limited to a wide array of video games, where the performance of multiple users/buddies are recorded and stored and used subsequently in a simulated multiple user activity. For example, it should be understood that the methodology for selecting other players/buddies/teams/groups with whom to play and/or to compete against extends beyond racing game applications—even though the illustrative embodiments focus on racing game implementations.

Additionally, the above-described embodiments involving the rendering of movie files with more complex objects and backgrounds have a wide range of applications extending well beyond racing applications. Moreover, such movie file embodiments may be combined with the various embodiments described above so that multiple ghost data packages are rendered into one, for example, AVI file and presented to a user for selection.

With respect to additional movie file applications, it is contemplated that such files may be applied to a variety of first person shooter games of the Halo 2 genre. In a movie mode, users would be enabled to download more complex renderings of recorded exciting team battles. Such battles may be processed by a server so that the user may watch them from exciting camera angles including key vantage points in the game—not necessarily following a player.

Additionally, downloaded movie files including, for example, more complex backgrounds and objects may be applied to massive multiplayer online games. In a movie mode, a game sequence may be recorded and compiled by a server into a movie file to permit users to watch exciting team battles. Such games which may have thousands of players at the same time, may present such battles from exciting camera angles including key vantage points in the game—not necessarily following a player.

The methodology of the present invention may, for example, also be applied to a wide array of simulation games such as city-building games of the Sim City genre. For example, in one possible further embodiment, each player may work on different sections of a city. Ghost data for different users is recorded who are, for example, building up different sections of the city. The package a player may download, in this example, represents the construction for different sections of the city. The player may, for example, build in the portion of the city that was not downloaded. For example, a city may have four quadrants. The player may build in quadrant 1, but download a package for quadrants 2, 3 and 4. In this example, the ghost data is used as actual data for the overall city and becomes the infrastructure for the entire city. The simulation on the player's computing device is run on the city as a whole.

In accordance with an exemplary movie mode in such an embodiment, a player may download a building sequence prepared by, for example, a server depicting in time-lapse, the building of a city, or combinations of cities.

The methodology described herein also may be applied to educational games. For example, individual performances of students may be recorded. Such performance data may, for example, involve learning golf, dancing, acting or other activities. By playing individual performances back in aggregate, instructors may identify which students are lagging relative to the rest of the students, and which are excelling. Such aggregate performances may be displayed, for example, using different display windows and if desired using thumbnail representations of individual students.

The methodology described herein also may be applied to music games including beat matching and other related games such as Donkey Konga, Dance Revolution, and Karaoke Revolution. In accordance with one exemplary embodiment, ghost data may be combinations of different performer's musical performances. Each ghost might play the same or a different instrument. The performance may be complementary, where one ghost plays drums and another ghost plays the piano. The user may, for example, play the guitar. In the case of Karaoke Revolution, the vocal performances of players may be combined together, such that a player may harmonize with the combined performance. Alternatively, a player may attempt to better the performance of the ghosts playing the same instrument, attempting to hit the same notes closest to the correct time, with the correct duration and intensity.

The methodology described herein also may be applied to a wide array of card games. For example, in accordance with an exemplary embodiment, versions of card games such as Blackjack or Texas Hold'em Poker may be played. In accordance with one such illustrative embodiment, the live players deck consists of all cards, minus the cards that were drawn by the ghost players during the performance. In combining ghost data, a server may, for example, determine if a deck (or set of decks) of cards could be constructed based on the ghost data performances of multiple players who were not drawing from the same deck. For example, if the game being played used one deck of cards, and two ghost data performances indicated that each player drew four aces, these two ghost data performances could not be combined into one package. Ghost data in this case would consist of the cards drawn by a player in each round, and their fold/bust status.

In such an illustrative embodiment, when a live player draws from the deck, the player draws from a deck that already has all of the cards removed that the ghost player removed during his entire play. For example, if one deck were used and if the ghost data drew these cards during his play of blackjack:

Hearts: A,2,6,9,Q; Spades: 3, 6, 8, 4, 7; Clubs: A, 9, J, 7; Diamonds: 6, 3, 9, the live players deck would consist of the following cards:

Hearts: 3,4,5,7,8,10,J,K; Spades: A,2,5,7,9,10, J, Q, K; Clubs: 2,3,4,5,6,8,10,Q,K; Diamonds: A,2,4,5,7,8,10,J,Q,K.

When the live player draws a card, in an exemplary embodiment, it is drawn at random from this reduced set of cards. When the ghost data draws a card, the ghost gets the exact card received when the ghost data was recorded.

In the case of blackjack, the ghost data may also record the dealer's hand in conjunction with the ghost player's hand so that the live player is playing against the same dealer. In this case, the dealer's cards also would be removed from the live player's deck.

The methodology described herein also may be applied to a wide array of individual performance event games (such as a simulated Olympic games). A player may enlist a group of his or her buddies to participate in such games or choose to compete against a set of famous athletes/celebrities. In such games in accordance with an exemplary embodiment, one player's performance may be measured against another's player's performance and scores may be generated to reflect each player's performance over time. Typically such simulated activities would not involve collisions between performers. It is also contemplated that such event games may be recorded with more complex players and backgrounds in, for example, a movie mode. Such event games may include but are not limited to:

Archery
Darts
Diving
Synchronized swimming (ghosts of individual swimmers attempting to synchronize to the same choreography.)
Swimming (lane races)
Foot races
High jump
Pole vault
Long jump
Triple jump
Shot put
Discus
Hammer throw
Javelin
Canoeing
Track cycling (this could be just for movie playback of a team, since this involves some interaction between players to be meaningful.)
Equestrian show jumping
Gymnastics
Rowing
Sailing
Shooting target, clays
Weightlifting
Home run derby
Slam dunk contest
Free throw contest While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A computer system comprising:
an input device that is used to provide input to a video game that includes a plurality of virtual objects located in a virtual space of the video game; and
a processing system that includes at least one hardware processor coupled to electronic memory, the processing system programmed to:
execute the video game;
perform, over a first period of time, a first render process as part of the video game to generate images of the virtual space from a first perspective that follows a first virtual object of the plurality of virtual objects during execution of the video game, the generated images for display on a display screen;
accept, via the input device and while the generated images are being displayed on the display screen, input to control where the first virtual object of the plurality of virtual objects is located within the virtual space of the video game;
during execution of the video game, record gameplay data that is based on the accepted input, the gameplay data usable for recreating where the first virtual object is located within the virtual space; and
perform, over a second period of time, a second render process that generates movie data that includes a plurality of images generated by the second render process, the second render process performed (a) using the recorded gameplay data to generate the plurality of images, (b) using at least a second perspective that is different from the first perspective used in the first render process, the second perspective showing different areas of the virtual space than the first perspective, and (c) without using further gameplay input that controls the first virtual object, where contents of the movie data are reproducible without re-use of the video game, the first render process, or the second render process,
wherein an amount of time for the first and second time periods is different.

2. The computer system of claim 1, wherein the processing system includes first processing resources and second processing resources, the first processing resources performing the first render process and the second processing resources performing the second render process.

3. The computer system of claim 2, further comprising a first transceiver associated with the first processing resources and a second transceiver associated with the second processing resources, wherein the recorded gameplay data is communicated, via an electronic data communications network that is coupled to both the first transceiver and the second transceiver, to the second processing resources for performance of the second render process.

4. The computer system of claim 1, further comprising a transceiver, wherein the processing system is further configured to transmit, using the transceiver, the movie data to a separate computing device to be played by the separate computing device, where the second computing device is not configured to execute the video game, the first render process, or the second render process.

5. The computer system of claim 1, wherein the contents of the movie data are encoded using a video compression process.

6. The computer system of claim 5, wherein the movie data is a single file that is stored to non-transitory storage of the computer system after generation thereof.

7. The computer system of claim 1, wherein the second render process is performed using higher graphical complexity than the first render process.

8. The computer system of claim 1, wherein the second render process uses second recorded gameplay data that is recorded as a result of executing another instance of the video game, to create the plurality of images that are part of the movie data.

9. The computer system of claim 8, wherein the second recorded gameplay data and the recorded gameplay data include data generated as a result of following different virtual objects during different instances of performance of the first render process for the video game.

10. A computing system for generating video content based on recorded interactions with a virtual three-dimensional world of a video game, comprising:
   an electronic memory storage device configured to store previously recorded video game data generated as part of video game rendering process that generates images in accordance with input provided via an input device while a first user plays the video game, the video game rendering process being performed over a first period of time, the generated images being of images of the virtual three-dimensional world that are generated by using a first virtual camera perspective, the previously recorded video game data based at least in part on input provided via the input device used to control the first virtual object during the video game, the previously recorded video game data including data for recreating at least a location of the first virtual object in the virtual three-dimensional world;
   a processing system that includes at least one hardware processor coupled to electronic memory, the processing system configured to:
      perform, over a second period of time, a movie rendering process to generate a plurality of images, the movie rendering process performed (a) using the previously recorded video game data stored in the electronic memory storage device, (b) using at least a second virtual camera perspective that is different from the first virtual camera perspective that was used in the video game rendering process, the second virtual camera perspective showing different areas of the virtual three-dimensional world than the first virtual camera perspective, and (c) without using further gameplay control input for the first virtual object; and
      encode movie data using the plurality of images, where contents of the movie data are reproducible without the use of the video game rendering process or the movie rendering process,
   wherein an amount of time for the first and second time periods is different for rendering for corresponding gameplay of the video game.

11. The computing system of claim 10, further comprising an electronic communication device configured to communicate with other computing devices over an electronic communications network,
   wherein the processing system is further configured to transmit, using the electronic communication device, the encoded movie data to a different computing device for reproduction thereon without requiring the use of the video game rendering process or the movie rendering process.

12. The computing system of claim 10, wherein the encoded movie data is a single file that is stored to non-transitory storage of the computer system after generation thereof.

13. The computing system of claim 10, wherein the movie rendering process is performed using higher graphical complexity than the video game rendering process.

14. The computing system of claim 10, wherein the movie rendering process includes generation of graphical elements that where not generated during the video game rendering process.

15. The computing system of claim 10, wherein the movie rendering process uses at least two different instances of previously recorded video game data to create the plurality of images, where one of the at least two different instances of previously recorded video game data is the previously recorded video game data.

16. The computing system of claim 15, wherein the at least two different instances of previously recorded video game data are based on different users controlling different virtual objects within the same instance of the virtual three-dimensional world.

17. The computing system of claim 10, wherein the processing system is further configured to incorporate audio commentary into the movie file.

18. A method of creating movie data from recorded gameplay data created via interaction with a video game, the method comprising:
   executing the video game;
   performing a first render process as part of the video game to generate images of the virtual space from a first perspective that follows a first virtual object of a plurality of virtual objects during execution of the video game, the first render process being performed over a first period of time;
   in correspondence with performing the first render process to generate the images, displaying the generated images on a display screen;
   accepting, via an input device and while the generated images are being displayed on the display screen and during the first render process, input to control the first virtual object of the plurality of virtual objects;
   during execution of the video game, recording, to an electronic memory storage device, gameplay data that is based on the accepted gameplay input, the gameplay data usable for recreating how the first virtual object was controlled during the first render process;
   performing, over a second period of time, a second rendering process that generates movie data based on a plurality of images generated by the second render process, the second render process performed (a) using the recorded gameplay data generate the plurality of images, (b) using at least a second perspective that is different from the first perspective that was used in the first render process, the second perspective showing different areas of the virtual space than the first perspective, and (c) without using further gameplay input that controls the first virtual object, where contents of the movie data are reproducible without the use of the first render process or the second render process; and
   transmitting the movie data to a separate computer system for reproduction thereof without the use of the first render process in the video game or the second render process,
   wherein an amount of time for the first and second time periods is different for rendering gameplay of the video game that is associated with the gameplay data.

19. The method of claim 18, wherein the second render process is performed using higher graphical complexity than the video game rendering process.

20. The method of claim 18, wherein the first render process is performed using first computer resources that includes at a first hardware processor and the second render process is performed using second computer resources that are separate from the first computer resources.

21. A non-transitory computer readable storage medium having stored thereon computer readable instructions for use with a computer system with at least one hardware processor, the stored computer readable instructions comprising instructions that are configured to cause the computer system to:

executing a video game;

perform a first render process as part of the video game to generate images of the virtual space from a first perspective that follows a first virtual object of a plurality of virtual objects during execution of the video game, the first render process being performed over a first period of time;

in correspondence with performance of the first render process to generate the images, display the generated images on a display screen;

accept, via an input device and while the generated images are being displayed on the display screen and during the first render process, input to control the first virtual object of the plurality of virtual objects;

during execution of the video game, record, to an electronic memory storage device, gameplay data that is based on the accepted gameplay input, the gameplay data usable for recreating how the first virtual object was controlled during the first render process;

perform over a second period of time, a second rendering process that generates movie data based on a plurality of images generated by the second render process, the second rendering process performed (a) using the recorded gameplay data generate the plurality of images, (b) using at least a second perspective that is different from the first perspective that was used in the first render process, the second perspective showing different areas of the virtual space than the first perspective, and (c) without using further gameplay input that controls the first virtual object, where contents of the movie data are reproducible without the use of the first rendering process or the second rendering process, wherein an amount of time for the first and second time periods is different for rendering corresponding gameplay for the video game.

* * * * *